United States Patent [19]
Dahl et al.

[11] 4,085,906
[45] Apr. 25, 1978

[54] MAGNETIC TAPE CARTRIDGE TRANSPORT

[75] Inventors: John Conlan Dahl; David Lee Barnett, both of Phoenix, Ariz.

[73] Assignee: Three Phoenix Company, Phoenix, Ariz.

[21] Appl. No.: 749,838

[22] Filed: Dec. 13, 1976

[51] Int. Cl.² .................. G11B 15/32; B65H 17/24
[52] U.S. Cl. .................. 242/192; 226/187; 226/188; 242/198
[58] Field of Search ........... 242/192, 206, 209, 210, 242/198, 199, 200, 201; 226/188, 187, 181; 360/96, 132

[56] References Cited

U.S. PATENT DOCUMENTS

| | | | |
|---|---|---|---|
| 3,692,255 | 9/1972 | Von Behren | 242/192 |
| 3,924,823 | 12/1975 | Cohen et al. | 242/198 |

OTHER PUBLICATIONS

*Magnetic Tape Cartridge Holder* – H. Stock, I.B.M. Technical Disclosure Bulletin, vol. 18, No. 3, Aug. 1975, pp. 781–782.

*Primary Examiner*—George F. Mautz
*Attorney, Agent, or Firm*—Cahill, Sutton & Thomas

[57] ABSTRACT

The magnetic tape cartridge transport includes a belt capstan which is accessible through the front edge of the cartridge for receiving rotary motion from a drive roller which is coupled to an electric motor. The electric motor extends through a motor opening in the base plate of the transport. A tape drive assembly includes an attachment bracket which is secured to the motor about its center of gravity and which extends laterally therefrom. The attachment bracket includes three apertures through which three shoulder bolts extend. The three shoulder bolts are positioned in a generally triangular spaced relationship about the motor opening of the base plate and are secured to the lower portion of the base plate. A pair of pivot pins are disposed between the lower surface of the base plate and the attachment bracket to permit the attachment bracket to pivot the tape drive assembly in a plane lying perpendicular to the front edge of the cartridge. A biasing spring surrounds each of the shoulder bolts and is positioned between the shoulder of the bolt and the attachment bracket for biasing the attachment bracket against the pivot pins for biasing the drive roller of the motor against the belt capstan of the cartridge to transfer rotary motion from the drive roller to the capstan.

10 Claims, 7 Drawing Figures

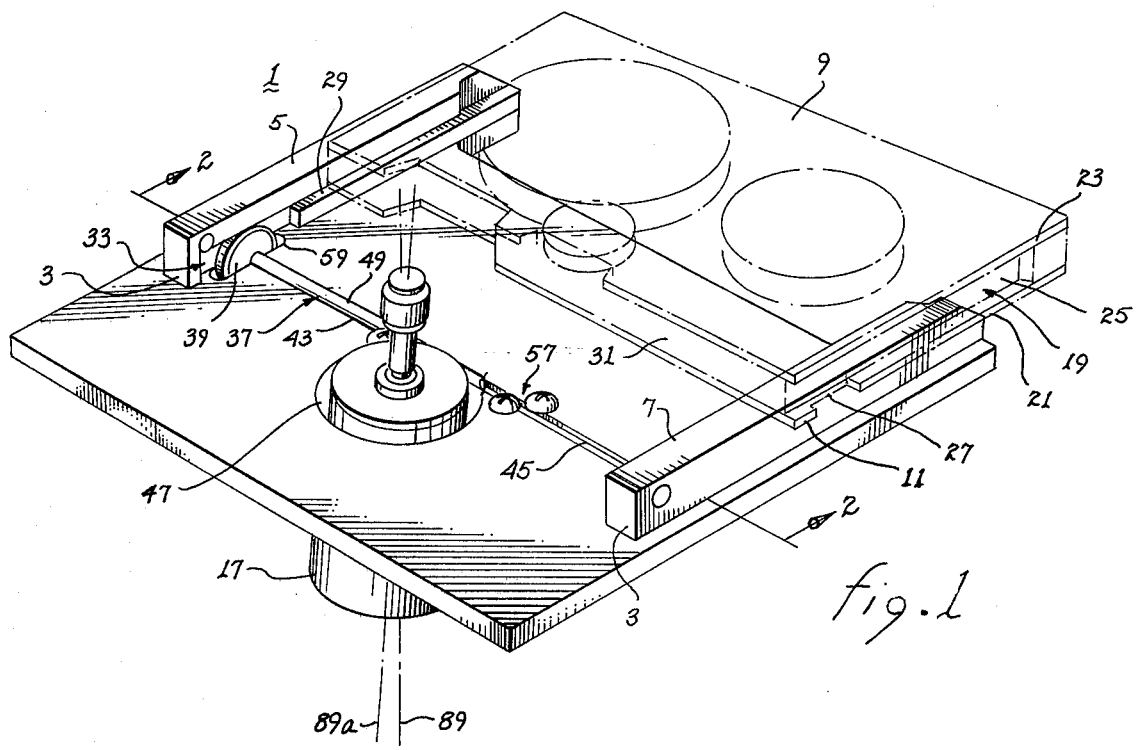
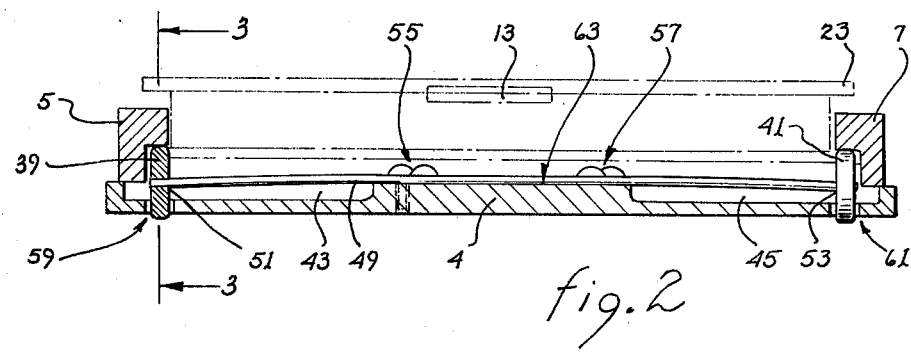
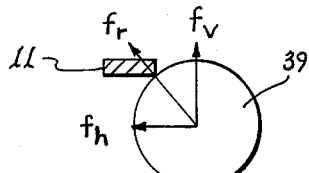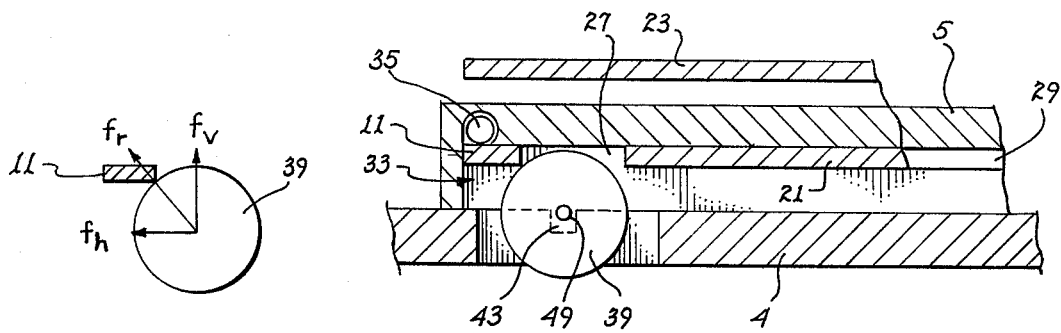

MAGNETIC TAPE CARTRIDGE TRANSPORT

BACKGROUND OF THE INVENTION

1. Field of the Invention

This invention relates to tape transports, and more particularly, to magnetic tape cartridge transport for transporting magnetic tape enclosed in a cartridge.

2. Description of the Prior Art

One of the most important requirements for a tape cartridge transport is that it include means for precisely aligning or registering the cartridge with magnetic recording and playback heads which are rigidly mounted on the transport. The transport must also accurately align the cartridge with the transport drive roller which provides a source of rotary motion for transporting the tape within the cartridge.

Magnetic tape cartridges used with digital computer processing equipment include a single registration tab on each of the lower front portions of each of the side edges of the cartridge. The registration of the cartridge upon the tape transport has typically been accomplished by providing a pair of over-center latches which rotate up into a locked position when a tape cartridge is fully inserted into the transport. These over-center latches rotate rearward out of the locked position when the cartridge is removed.

Over-center latches significantly increase the cost and complexity of the tape transport since they require a number of springs, spring attachment points and mounting hardware. Because of the friction forces between the over-center latches and the registration tabs during removal and insertion of the tape cartridge, the relatively soft aluminum registration tabs are worn and eroded. After a period of time erosion of the registration tabs requires that the cartridge be retired from service.

A further disadvantage of over-center latches is that proper registration of a tape cartridge in the tape transport is partially dependent on the manner of insertion of the cartridge into the transport by the user. Sloppy or nonstandard insertion techniques yield improper registration of the cartridge in the transport which can lead to degraded performance.

Magnetic tape cartridges of the type used in digital data applications include a belt capstan which must be frictionally engaged with an electric motor-driven tape drive roller to impart motion to the tape within the cartridge. Prior art magnetic tape cartridge transports pivotally mount the tape drive assembly on a lever arm which is spring biased into a predetermined position so that insertion of the tape cartridge forces the tape cartridge belt capstan into frictional contact with the tape drive roller with about a 14 ounce force. This force ensures proper frictional coupling of the drive roller with the belt capstan and guarantees that the rotary motion necessary to transport the tape in the cartridge is available.

Prior art tape transports also include a tape drive assembly which incorporates an electric motor for rotating a tape drive roller. This tape drive assembly consists of a pivotable, spring biased lever arm assembly to which the tape drive roller and motor are mounted. This assembly is spring biased to provide a 10 – 14 ounce force between the drive roller and cartridge belt capstan when a cartridge is fully inserted into the transport.

This prior art pivoted, spring biased assembly increases the difficulty of inserting the tape cartridge into the tape transport since during the final cartridge insertion movement, the relatively heavy tape drive assembly must be forceably displaced a distance sufficient to ensure proper spring biasing between the tape drive roller and cartridge belt capstan.

This tape drive assembly yields differing drive roller-belt capstan pressures when the transport is mounted in a vertical position, as contrasted with a horizontal position. In a vertical mounting position the weight of the motor and its associated lever arm is the tape drive assembly is either added to or subtracted from the desired force between the drive roller and the belt capstan since the weight of the tape drive assembly would either add to or subtract from the spring biasing force which was designed into the system.

An additional disadvantage of this tape drive assembly is that it substantially increases the cost and complexity of the magnetic tape cartridge transport since a variety of mechanical attachment points, bearings, lever arms and springs are required.

SUMMARY OF THE INVENTION

It is therefore a primary object of the present invention to provide a magnetic tape cartridge transport which includes cartridges biasing means for exerting a force at a single point on each cartridge registration tab for biasing the cartridge forwardly and upwardly against the cartridge guides of the tape transport to accurately register the cartridge within the tape transport.

Another object of the present invention is to provide a magnetic tape cartridge transport which includes a single pair of metal wheels and a single, semi-rigid shaft for biasing the cartridge forwardly and upwardly against the cartridge guides of the tape transport to accurately register the cartridge within the tape transport.

Yet another object of the present invention is to provide a magnetic tape cartridge transport which biases the the cartridge against the registration surfaces of the tape transport in a simple and reliable, yet inexpensive manner.

Still another object of the present invention is to provide a magnetic tape cartridge which minimizes the wear on the cartridge registration surfaces.

It is another primary object of the present invention to provide a magnetic tape cartridge transport which biases the tape drive roller against the cartridge belt capstan by providing a tape drive assembly which allows the motor and the tape drive roller to pivot in a plane perpendicular to the front edge of the tape cartridge.

Another object of the present invention is to provide a magnetic tape cartridge transport which includes a motor coupled to the base plate of the tape transport by an attachment bracket which is secured to the motor about its center of gravity so that either horizontal or vertical mounting of the tape transport will have no effect on the force between the tape drive roller and the cartridge belt capstan.

Yet another object of the present invention is to provide a magnetic tape cartridge transport having a tape drive assembly which has a minimum number of moving parts.

Still another object of the present invention is to provide a magnetic tape cartridge transport having a tape drive assembly which pivots through a small angle upon insertion of the tape cartridge to engage the drive pulley with the cartridge belt capstan.

Briefly stated, and in accord with one embodiment of the invention, a magnetic tape cartridge transport is designed to transport magnetic tape enclosed in a cartridge having a belt capstan accessible through the front edge thereof for receiving rotary motion from a drive roller coupled to an electric motor which passes through a motor opening in a base plate of the transport. An attachment bracket is secured to the motor about its center of gravity and includes first, second and third apertures. First, second and third downwardly extending shafts are positioned in triangularly spaced relationship about the motor opening of the base plate. The first, second and third shafts protrude respectively through the first, second and third apertures in the attachment bracket and include shoulders on the ends thereof. A pair of pivot pins extend downwardly from the base plate and are pivotably attached to the motor attachment bracket to permit the motor and thereby the drive roller to pivot in a plane perpendicular to the front edge of the cartridge. Spring biasing means surround each of the three shafts and are positioned between the shoulder of the shafts and the attachment bracket to bias the attachment bracket against the pivot pins and to bias the drive roller of the motor against the belt capstan of the cartridge to couple the rotary motion of the transport motor to the cartridge belt, capstan for transporting the magnetic tape contained in the tape cartridge.

The tape transport also includes cartridge guide means which extend upwardly from the base plate and parallel to the edges of the tape cartridge for engaging the cartridge on each side thereof and for accurately positioning the cartridge with respect to the base plate. The cartridge guide means additionally includes registration means for properly registering the front edge of the cartridge with respect to the base plate when the cartridge is properly biased thereagainst. Cartridge biasing means biases the registration tabs of the cartridge against the registration means of the cartridge guide means for precisely registering the cartridge within the cartridge guide means. The cartridge biasing means comprises wheel means disposed in the cartridge guide means and displaceable therein for permitting the cartridge to be readily removed from and inserted into the tape transport. The cartridge biasing means exerts a force at a single point on each cartridge registration tab when the cartridge is inserted into the cartridge guide means for biasing the cartridge forwardly and upwardly against the registration means to accurately register the cartridge within the cartridge guide means.

DESCRIPTION OF THE DRAWING

The invention is pointed out with particularly in the appended claims. However, other objects and advantages, together with the operation of the invention, may be better understood by reference to the following detailed description taken in connection with the following illustrations wherein:

FIG. 1 is a perspective view of a magnetic tape cartridge transport of the present invention showing a tape cartridge partially inserted in the transport.

FIG. 2 is a sectional view of the magnetic tape cartridge transport of FIG. 1, taken along line 2—2.

FIG. 3A is a sectional view of the magnetic tape cartridge transport of FIG. 2, taken along line 3—3, and showing a tape cartridge fully inserted in the tape transport.

FIG. 3B is a vector diagram showing the forces exerted by the wheel shown in FIG. 3A upon the registration tab of the tape cartridge.

DESCRIPTION OF THE PREFERRED EMBODIMENT

Figure 4:
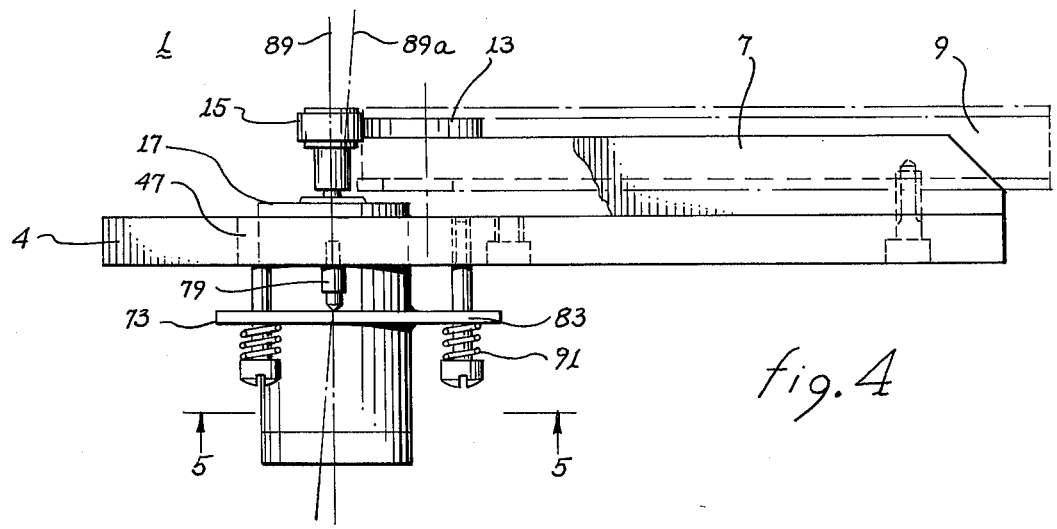
FIG. 4 is a cross sectional view of the magnetic tape cartridge transport shown in FIG. 1 showing a tape cartridge fully inserted within the transport, and particularly illustrating the tape drive assembly.

In order to better illustrate the advantages of the invention and its contributions to the art, a preferred hardware embodiment of the invention will now be described in some detail.

The cartridge biasing means of the magnetic tape cartridge transport 1 will first be described by reference to FIGS. 1–3. The tape drive assembly of transport 1 will then be described by reference to FIGS. 4–6.

Referring now to FIG. 1, cartridge guide means 3 includes a first cartridge guide 5 and a second cartridge guide 7. FIG. 1 shows a ¼ inch digital tape cartridge 9 inserted approximately one half way into cartridge guide means 3. Cartridge 9 is commercially available and is further described in U.S. Pat. No. 3,692,255.

Cartridge 9 includes a pair of registration tabs, such as registration tab 11, which are located on the forwardmost portion of the side edges of cartridges 9. Cartridge 9 further includes a belt capstan 13, which upon being forced into frictional contact with drive roller 15 of electric motor 17, will impart motion to the tape contained in cartridge 9. Cartridge 9 further includes a cartridge guide assembly 19 on either side thereof which includes a lower metalic lip 21, an upper plastic lip 23 and a cartridge guide channel 25 lying therebetween. A notch 27 is removed from lower metalic lip 21 to provide registration tab 11.

Lower metalic lip 21 of cartridge 9 slides within a groove, such as groove 29, in first cartridge guide 5 and second cartridge guide 7. The front surface 31 of cartridge 9 is accurately positioned with respect to base plate 4 by causing registration tabs 11 to be registered firmly against vertical registration surface 33 and registration pin 35. The positioning of registration tabs 11 against registration surface 33 and registration pin 35 in each of the two cartridge guide means ensures that the tape will be properly positioned with respect to a tape head which would typically be included on base plate 4 and with respect to drive roller 15 of motor 17. Cartridge biasing means 37 is provided to ensure that this twofold registration requirement is met.

Referring now to FIGS. 1, 2 and 3A, cartridge biasing means 37 includes wheels 39 and 41 which are typically fabricated from a metal such as steel. Cartridge biasing means 37 further includes first groove 43 and second groove 45 which are cut into the upper surface of base plate 4 and which extend from an area in the vacinity of a motor opening 47 in base plate 4 to locations beneath cartridge guide means 3. A 0.090 inch diameter length of music wire forms a semi-rigid axle 49 a portion of which has been omitted from FIG. 1 for illustrative purposes. Axle 49 passes through a cylindrical passageway 51 located in the center of wheel 39, through groove 43, over the midportion of base plate 4, into groove 45, and then through cylindrical passageway 53, which passes through the center of wheel 41. Securing means consisting of a first pair of screws 55 and a second pair of screws 57, which are threadably connected to base plate 4 on each side of axle 49, rigidly secure axle 49 to the mid-portion of base plate 4. Oval shaped apertures 59 and 61 which are disposed in base plate 4 are larger is size than wheels 39 and 41 to allow these wheels to be freely displaceable therein in the vertical direction.

FIGS. 1 and 2 show cartridge biasing means 37 in the disengaged position when a cartridge is not inserted in the transport. Since cylindrical passageways 51 and 53 in wheels 39 and 41 are positioned at a level beneath the upper surface 63 of base plate 4, the outer portion of axle 49 will be biased downwardly into grooves 43 and 45. This downward bending of axle 49 will cause axle 49 to exert a vertically upward force on wheels 39 and 41 which will force them into positive contact with the upper surface of groove 29.

The operation of the cartridge biasing means will now be described. As cartridge 9 is inserted further into cartridge guide means 3 from the position shown in FIG. 1, the leading edge of registration tab 11 will strike the outer surface of wheels 39 and 41. As cartridge 9 is moved further into cartridge guide means 3, registration tab 11 will exert a force on wheels 39 and 41 which will cause them to be displaced downwardly. This downward displacement will bend axle 49 downward into grooves 43 and 45. When wheels 39 and 41 have been downwardly displaced a distance equal to the depth of registration tab 11, tab 11 will then freely roll over wheels 39 and 41. As cartridge 9 is fully inserted into cartridge guide means 3, FIG. 3A shows that registration tab 11 will be forced against registration surface 33 and registration pin 35. When cartridge 9 has been thus positioned, wheels 39 and 41 will again move upward and will exert a vector force at approximately a 45° angle from the center of the wheels against registration tabs 11. The downward displacement of axle 49 beneath the upper surface 63 of base plate 4 causes a biasing force to be continually exerted at this approximately 45° angle against registration tabs 11. FIG. 3B illustrates the vertical force component $f_v$ and the horizontal vector component $f_h$, $f_h$ forces tab 11 into proper registration with surface 33 while $f_v$ forces tab 11 into proper registration with pin 35. As can be seen from FIG. 3A, the upper surface of wheels 39 and 41 lies slightly beneath the upper surface of groove 29. Depending on the curvature of wheels 39 and 41, the contact between the outer surface of these wheels and registration tabs 11 will either be a point or a small linearly shaped area.

The removal of cartridge 9 is readily effected by merely pulling the cartridge directly out of the cartridge guide means 3. This pulling action displaces wheels 39 and 41 downwardly and allows registration tabs 11 to roll thereover.

While grooves 43 and 45 have been shown to have a generally rectangular cross section, it has been found advantageous due to manufacturing considerations to fabricate these grooves in an inverted V-type configuration wherein the spacing between the upper edges of the groove is somewhat less than the spacing between the lower edges thereof.

Figure 5:
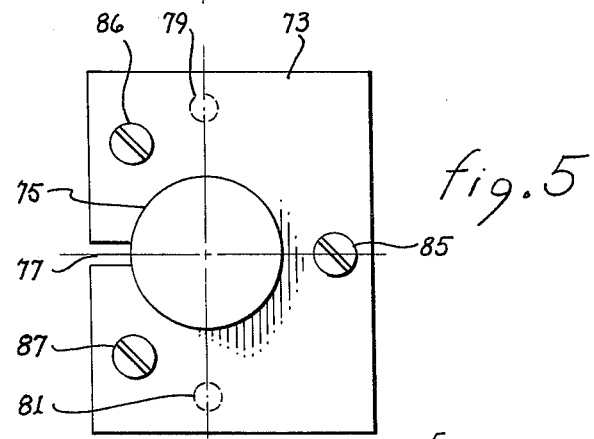
FIG. 5 is a sectional view of the tape drive assembly shown in FIG. 4, taken along line 5—5.
Figure 6:
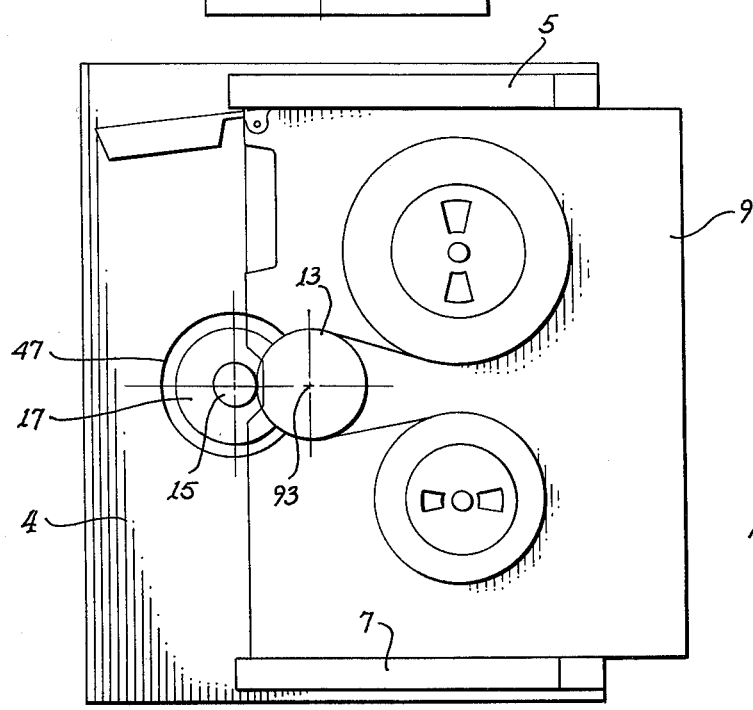
FIG. 6 is an elevational view from above of the magnetic tape cartridge transport shown in FIG. 4.

The tape drive assembly will now be described by referring to FIGS. 4, 5 and 6. Motor 17 extends through motor opening 47 in base plate 4. An attachment bracket 73 includes a cylindrical aperture 75 which is slightly smaller in diameter than the diameter of motor 17. A notch 77 is cut in attachment bracket 17 between an outer edge and cylindrical aperture 75. The opposing surfaces of notch 77 are stretched outwardly to temporarily slightly increase the diameter of cylindrical aperture 75. During this procedure motor 17 is inserted within cylindrical aperture 75. Motor 17 is positioned within aperture 75 so that its center of gravity lies within the plane formed by attachment bracket 73. When the external force is released from attachment bracket 73, cylinder aperture 75 resumes its normal diameter and tightly grips the outer edges of motor 17.

Pivot pins 79 and 81 extend downwardly from the lower portion of base plate 4 and are positioned in a plane parallel to the front face of cartridge 9. Three apertures, such as aperture 83, are drilled through attachment bracket 73. Shoulder bolts 85, 86 and 87 extend through the apertures in attachment bracket 73 and are secured to the lower surface of base plate 4. Shoulder bolts 85, 86 and 87 are positioned in a generally triangular spaced relationship about cylindrical aperture 75 of attachment bracket 73. The shoulder bolts are also attached to base plate 4 in a manner which places cylindrical aperture 75 in a generally coaxial position with respect to motor aperture 47 of base plate 4.

Pivot pins 79 and 81 and the three shoulder bolts are positioned so that motor centerline 89 extends through the plane formed by the two pivot pins and passes through the center of motor opening 47 when cartridge 9 is inserted in transport 1.

Shoulder bolts 86 and 87 and the corresponding apertures in attachment bracket 73 are oriented to form a plane parallel to the plane intersecting pivot pins 79 and 81. Shoulder bolts 86 and 87 are symetrically disposed with respect to the plane passing through shoulder bolts 85 and motor center line 89. Shoulder bolt 85 and its corresponding aperture in attachment bracket 73 lie in a plane which passes through the motor centerline 89 and which intersects the plane passing through shoulder bolts 86 and 87 at a 90° angle.

Biasing means or springs, such as spring 91, are positioned between the lower surface of attachment bracket 73 and the shoulder portion of the three shoulder bolts. Each of these three springs is identical to the other, just as the three shoulder bolts are identical.

It is desired that when cartridge 9 is removed from magnetic tape cartridge transport 1 that the motor center line 89 of the tape drive assembly be displaced into a second position indicated by motor centerline 89A. The plane formed by intersecting motor centerlines 89 and 89A is coextensive with the plane formed by shoulder bolt 85 and motor center line 89. Thus when the cartridge 9 is removed from the transport 1, the tape drive assembly is displaced in a plane perpendicular to the front face of cartridge 9. Similarly, when cartridge 9 is reinserted in transport 1, belt capstan 13 impinges directly upon drive roller 15 so that capstan drive axle 93 is positioned in the plane formed by motor center lines 89 and 89A.

Shoulder bolts 85, 86 and 87 are positioned according to the constraints set forward above so that upon removal of cartridge 9, the axis of motor 17 and drive roller 15 will be canted from centerline orientation 89 to centerline orientation 89a. Furthermore, this positioning of the three shoulder bolts is accomplished to obtain an approximate 10 ounce force between drive roller 15 and belt capstan 13 upon insertion of cartridge 9 into transport 1.

As can be seen, the utilization of various different parts is substantially minimized in this embodiment: pivot pins 79 and 81 are identical; shoulder bolts 85, 86 and 87 are identical; and the three springs 91 are identical.

Since motor 17 is suspended about its center of gravity by attachment bracket 73, the tape drive assembly is far less susceptible to externally induced shocks then would otherwise be the case. Furthermore, due to the suspension about the motor's center of gravity, a vertical or horizontal orientation of the transport 1 will have no affect on the force between drive roller 15 and belt capstan 13. Additionally, insertion of cartridge 9 into transport 1 must only displace the tape drive assembly from the position indicated by axis 89a to the position indicated by axis 89. A minimal amount of mass is displaced by this small rotational motion, whereas in the prior art assemblies which incorporated a complex pivot arm assembly, a very substantial amount of mass must be moved each time a cartridge is inserted into the transport.

While the tape drive assembly has been described as being used in conjunction with a ¼ inch digital tape cartridge 9, it is obvious that a similar arrangement could be utilized as a tape drive assembly to drive an eight-track cartridge since the eight-track cartridge also includes an internally mounted pressure roller which is equivalent to belt capstan 13 of the described embodiment.

It will be apparent to those skilled in the art that the disclosed magnetic tape cartridge transport may be modified in numerous ways and may assume many embodiments other than the preferred form specifically set out and described above. Accordingly, it is intended by the appended claims to cover all such modifications of the invention which fall within the true spirit and scope of the invention.

What is claimed is:

1. In a magnetic tape cartridge transport for transporting magnetic tape enclosed in a cartridge having capstan means accessible through a front edge thereof for receiving rotary motion from a drive roller coupled to an electric motor which passes through a motor opening in a base plate of the transport, the improvement comprising:
   (a) an attachment bracket secured to the motor and extending laterally therefrom and having first, second and third apertures therein;
   (b) first, second and third downwardly extending shafts positioned in spaced relationship about the motor opening of the base plate and secured to the base plate, said first, second and third shafts protruding respectively through the first, second and third apertures in said attachment bracket and including shoulders on the lower ends thereof;
   (c) pivot means for permitting said attachment bracket to pivot the drive roller in a plane perpendicular to the front edge of the cartridge; and
   (d) biasing means surrounding each of said shafts and positioned between said shoulder and said attachment bracket for biasing said attachment bracket against said pivot means and for biasing the drive roller of the motor against the capstan means of the cartridge to transfer rotary motion from the drive roller to the capstan means.

2. The apparatus of claim 1 wherein said attachment bracket includes a metal plate having an aperture therein; and wherein the motor is disposed through the aperture in said attachment bracket.

3. The apparatus of claim 2 wherein said biasing means includes a spring.

4. The apparatus of claim 3 wherein the motor includes a central axis; and wherein said pivot means further includes a first and a second pivot pin secured to the lower portion of the base plate and lying in a plane parallel to a plane defined by the front edge of the cartridge.

5. The apparatus of claim 4 wherein said second and said third downwardly extending shafts lie within a plane parallel to the plane defined by said first and said second pivot pins.

6. The apparatus of claim 5 wherein said second and said third downwardly extending shafts are symetrically disposed about a plane passing through the central axis of said motor and oriented at a 90° angle to the plane in which said second and said third shafts are disposed.

7. The apparatus of claim 6 wherein said first downwardly extending shaft lies within the plane about which said second and said third downwardly extending shafts are symetrically disposed.

8. The apparatus of claim 7 wherein said first, second and third downwardly extending shafts include first, second and third shoulder bolts.

9. The apparatus of claim 8 wherein said first, second and third shoulder bolts are disposed upon said attachment bracket so that a resultant force displaces said attachment bracket for biasing the drive roller of the motor against the capstan means of the cartridge.

10. The apparatus of claim 9 wherein said attachment bracket is a flat plate; and wherein the plane formed by said attachment bracket passes through the center of gravity of the motor.

* * * * *